United States Patent
Cetin et al.

(10) Patent No.: US 6,308,758 B1
(45) Date of Patent: Oct. 30, 2001

(54) ELASTOMERIC TIRE HAVING MAGNETIZED SIDEWALL AND METHOD OF MANUFACTURING SAME

(75) Inventors: A. Yuecel Cetin, Cornelius; James M. Giustino, Waxhaw, both of NC (US)

(73) Assignee: Continental AG, Hannover (DE)

( * ) Notice: Subject to any disclaimer, the term of this patent is extended or adjusted under 35 U.S.C. 154(b) by 0 days.

(21) Appl. No.: 09/347,757

(22) Filed: Jul. 6, 1999

(51) Int. Cl.⁷ ................................................. B60C 13/02
(52) U.S. Cl. ......................... 152/523; 152/450; 152/525
(58) Field of Search ...................... 152/523, 524, 152/525, 450, 152.1; 324/167, 174; 264/429; 156/110.1, 123; 73/146, 514.39

(56) References Cited

U.S. PATENT DOCUMENTS

| | | |
|---|---|---|
| 3,225,810 | 12/1965 | Enabnit . |
| 3,233,647 | 2/1966 | Newell . |
| 3,372,726 * | 3/1968 | Sidles ................................... 152/523 |
| 3,469,662 | 9/1969 | Dewar . |
| 3,705,284 | 12/1972 | Binard . |
| 3,708,750 | 1/1973 | Bucks et al. . |
| 3,750,120 | 7/1973 | McCarty . |
| 4,570,152 | 2/1986 | Melton et al. . |
| 4,698,536 | 10/1987 | Oohori . |
| 5,026,178 | 6/1991 | Ballhaus . |
| 5,131,763 | 7/1992 | Caron . |
| 5,261,752 | 11/1993 | Ouchi et al. . |
| 5,645,660 * | 7/1997 | Atiniello et al. ...................... 152/523 |
| 5,895,854 | 4/1999 | Becherer et al. . |
| 5,913,240 | 6/1999 | Drahne et al. . |

FOREIGN PATENT DOCUMENTS

| | | |
|---|---|---|
| 3942573A1 | 6/1991 | (DE) . |
| 19503469C1 | 2/1995 | (DE) . |
| 44 35 160A1 | 4/1996 | (DE) . |
| 19503468C1 | 5/1996 | (DE) . |
| 19620582A1 | 11/1997 | (DE) . |
| 19646251A1 | 5/1998 | (DE) . |
| 0 101 225 | 2/1984 | (EP) . |
| 0 049 893 | 1/1986 | (EP) . |
| 0 375 019 A1 | 6/1990 | (EP) . |
| 0 833 162 A2 | 4/1998 | (EP) . |
| 0 833162A3 | 5/1998 | (EP) . |
| 0 978 939 A2 | 2/2000 | (EP) . |
| 2 574 501 | 6/1986 | (FR) . |

* cited by examiner

*Primary Examiner*—Geoffrey L. Knable
(74) *Attorney, Agent, or Firm*—Calfee, Halter & Griswold LLP

(57) ABSTRACT

The present invention provides a tire with a sidewall having a magnetized outer layer. The sidewall outer layer is peripherally divided into sections with radially extending ribs between each adjacent pair of sections. The ribs protrude above the sections. In the peripheral direction, the ribs are significantly narrower than the sections. The sections are magnetized in a peripheral direction, but with alternating polarity. The ribs close the circles of magnetic flux by allowing lines of magnetic flux to enter and exit the sidewall outer layer after moving through the surrounding air and the magnetized sections, respectively. The ribs focus the location of the entry and exit of the lines of magnetic flux into and out of the sidewall outer layer. This focused entry and exit is achieved by the accumulation of magnetized material in the ribs which causes the lines of magnetic flux moving through the ribs to point in a direction perpendicular to the plane of the tire sidewall. As a result of this focused entry and exit, sharp edges between the areas of opposite polarization are achieved which enables the precise measurement of the peripheral locations of the lines of magnetic flux. By enabling such a precise measurement, the present invention provides for a more accurate determination of information relating to the dynamic behavior of the tire.

5 Claims, 2 Drawing Sheets

ELASTOMERIC TIRE HAVING MAGNETIZED SIDEWALL AND METHOD OF MANUFACTURING SAME

FIELD OF THE INVENTION

The present invention relates generally to an elastomeric tire and a method of manufacturing same and, more particularly, to a tire with a sidewall having a magnetized outer layer, the sidewall outer layer being peripherally divided into sections of alternating polarity with radially extending ribs between each adjacent pair of sections, and a method of manufacturing same.

BACKGROUND OF THE INVENTION

Published European Patent Application 849 597 describes a tire comprising at least one magnetized area which can be used for instance for providing information about the rotary speed of the tire when mounted on a vehicle and to measure other physical quantities. The subject of this published patent application is a tire that, at least at one predetermined location, contains a rubber mixture that is permeated with magnetizable particles. These magnetizable locations, in general an annular band in the sidewall of the tire, have successive sections of alternating magnetization, either equidistant or in a pattern. Thus, with the aid of a sensor that is secured to the chassis, not only the rotational speed of the respective wheel can be provided, but also, by measuring the tire distortion through deflection of the applied magnetized sections, forces acting on the tires can be determined.

This known tire is manufactured by mixing ferromagnetic particles into the rubber mixture which is applied to the area where the magnetization is carried out. The magnetization is then achieved by applying magnetic fields with lines of flux that extend in the peripheral direction of the tire in alternating polarizations. This magnetization is effected after installation of the magnetizable rubber mixture and after vulcanization thereof. Also described is an apparatus to carry out the magnetization.

It has been found, however, that, on the tire described, the desired magnetization is very hard to achieve. Depending on the method applied, either there is no identifiable signal at all, or the magnetized areas of opposite polarizations are not separated by the desired narrow line but, instead, wide lines are formed which blur and distort the signals detected by a respective sensor. Thus the measurements obtained are imprecise.

SUMMARY OF THE INVENTION

The present invention provides a tire with a sidewall having a magnetized outer layer. The sidewall outer layer is peripherally divided into sections with radially extending ribs between each adjacent pair of sections. The ribs protrude above the sections. In the peripheral direction, the ribs are significantly narrower than the sections. The sections are magnetized in a peripheral direction, but with alternating polarity. The ribs close the circles of magnetic flux by allowing lines of magnetic flux to enter and exit the sidewall outer layer after moving through the surrounding air and the magnetized sections, respectively.

The ribs focus the location of the entry and exit of the lines of magnetic flux into and out of the sidewall outer layer. This focused entry and exit is achieved by the accumulation of magnetized material in the ribs which causes the lines of magnetic flux moving through the ribs to point in a direction perpendicular to the plane of the tire sidewall. As a result of this focused entry and exit, sharp edges between the areas of opposite polarization are achieved which enables the precise measurement of the peripheral locations of the lines of magnetic flux. By enabling such a precise measurement, the present invention provides for a more accurate determination of information relating to the dynamic behavior of the tire.

DETAILED DESCRIPTION OF THE INVENTION

Figure 1:
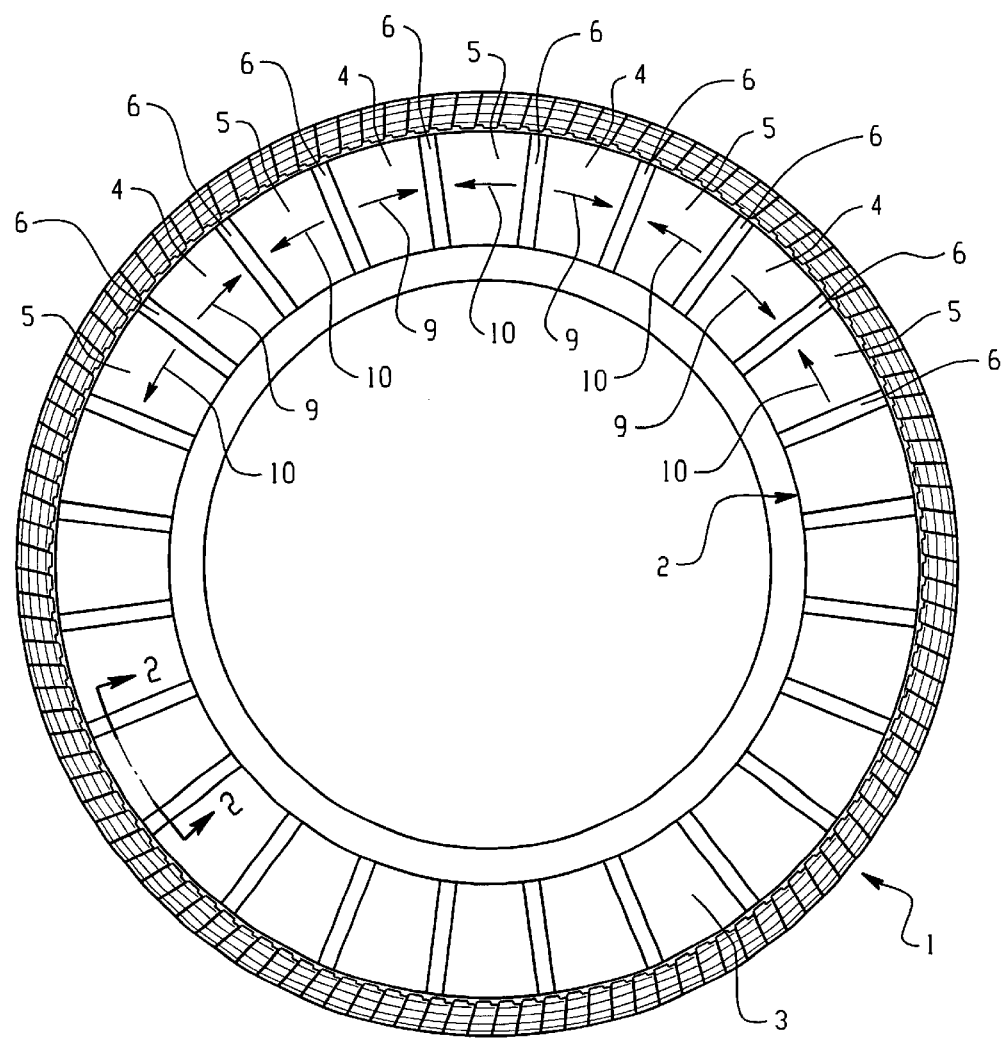
FIG. 1 shows a side view of a tire constructed according to the principles of the present invention in which an outer layer of a sidewall of the tire is peripherally divided into sections of alternating polarity with radially extending ribs between each adjacent pair of sections.

In FIG. 1, a tire 1 is depicted with a sidewall 2 having a magnetized outer layer 3. Throughout the following description, the term "peripheral" is used for the direction along a rotary movement of the tire sidewall, while "radial" is used for directions perpendicularly crossing an imaginary rotary axis of the tire, i.e., from hub to tread. The sidewall outer layer 3 is peripherally divided into sections 4 and 5 with radially extending protrusions or ribs 6 between each adjacent pair of sections 4 and 5. The ribs 6 protrude above the sections 4 and 5 (see FIG. 2).

Figure 2:
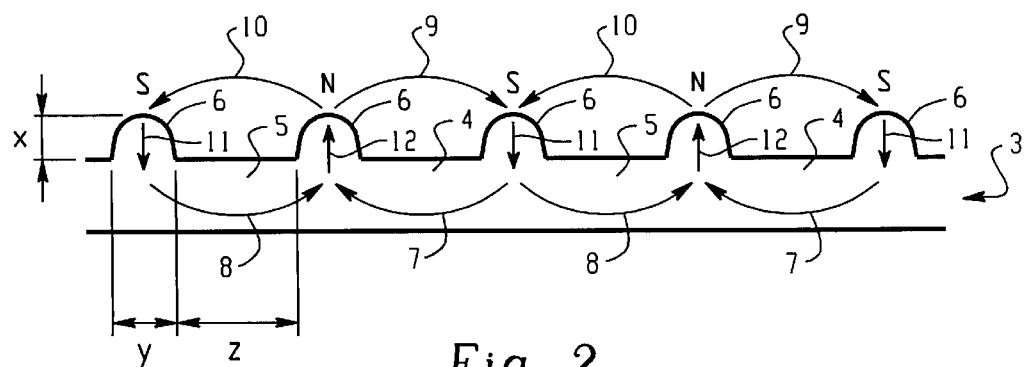
FIG. 2 shows a cross-sectional view of the sidewall outer layer shown in FIG. 1 taken along arcuate line 2—2.

In the embodiment of the invention shown in FIGS. 1 and 2, the ribs 6 are equidistant from one another in the peripheral direction. However, depending on the purpose to be served, the peripheral distance between the ribs 6 could vary. By varying the peripheral distance between the ribs 6, a unique pattern can be established. In the peripheral direction, the ribs 6 are significantly narrower than the sections 4 and 5. Generally, the sidewall outer layer 3 includes as many ribs as feasible to enable the precise measurement of the lines of magnetic flux, even at low speeds. For a standard passenger tire, the sidewall outer layer 3 includes approximately 96 ribs where the height x of the ribs 6 is less than or equal to $\frac{1}{16}$ of an inch, the width y of the ribs 6 is less than or equal to $\frac{1}{16}$ of an inch, and the width z of the sections 4 and 5 is approximately 2 inches. For a larger truck tire, however, the sidewall outer layer could include 200 or more ribs. In the embodiment of the invention shown in FIG. 2, the ribs 6 have a generally semicircular shape in cross-section. However, the ribs 6 could have other shapes, e.g., triangular, square.

FIG. 2 shows the lines of magnetic flux in the sidewall outer layer 3, including the sections 4 and 5 and the ribs 6. Generally, the sections 4 are magnetized in a clockwise orientation with respect to the tire as shown by lines of magnetic flux 7 and the sections 5 are magnetized in a counter-clockwise orientation as shown by lines of magnetic flux 8. Thus, the magnetization of the sections 4 and 5 is always applied in a peripheral direction, but with alternating polarity. Outside of the sidewall outer layer 3 in the surrounding air, lines of magnetic flux 9 correspond to lines 7 and lines of magnetic flux 10 correspond to lines 8. The ribs 6 close the circles of magnetic flux by allowing lines of magnetic flux 11 to enter the sidewall outer layer 3 after moving through the surrounding air and lines of magnetic flux 12 to exit the sidewall outer layer 3 after moving through either magnetized section 4 or 5. Thus, one circle of magnetic flux is formed by the lines of magnetic flux 7, 12, 9, 11, in this order. A circle of magnetic flux in the opposite direction is formed by the lines of magnetic flux 8, 12, 10, 11. As can be seen from FIG. 2, the present invention utilizes the principle of a horseshoe magnet in the magnetized sidewall outer layer 3. The ribs 6 form alternating North and South poles N and S, where each of the poles is shared by two adjacent imaginary horseshoe magnets. The sidewall outer layer 3, including the sections 4 and 5 and the ribs 6, can be magnetized using any known method of magnetization. Such methods are well-known in the art and will not be discussed herein.

As can be seen from FIGS. 1 and 2, the ribs 6 focus the location of the entry and exit of the lines of magnetic flux into and out of the sidewall outer layer 3. This focused entry and exit is achieved by the accumulation of magnetized material in the ribs 6 which causes the lines of magnetic flux 11 and 12 to point in a direction perpendicular to the plane of the tire sidewall 2. As a result of this focused entry and exit, sharp edges between the areas of opposite polarization are achieved which enables the precise measurement of the peripheral locations of the lines of magnetic flux. By enabling such a precise measurement, the present invention provides for a more accurate determination of information relating to the dynamic behavior of the tire (as will be discussed in greater detail below).

Figure 3:
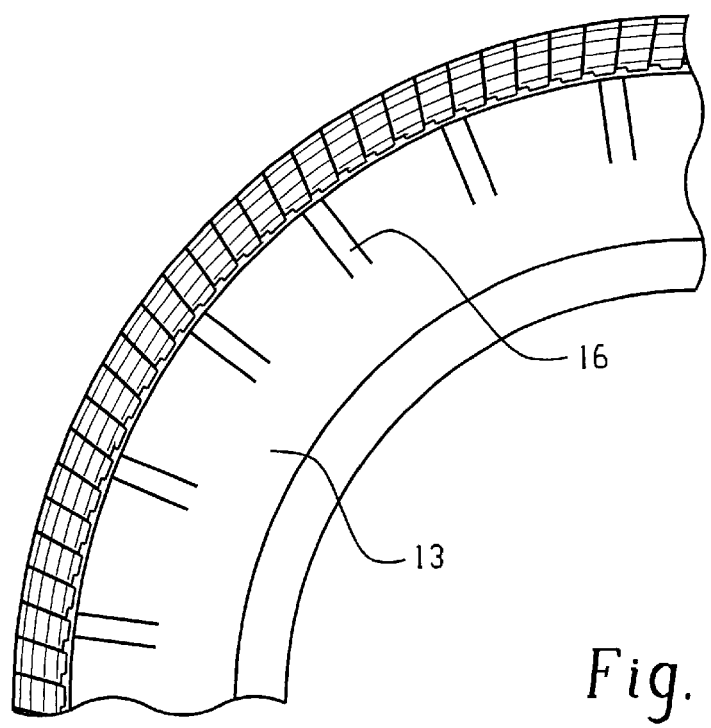
FIG. 3 shows an alternate embodiment for the arrangement of radially extending ribs on a sidewall outer layer.
Figure 4:
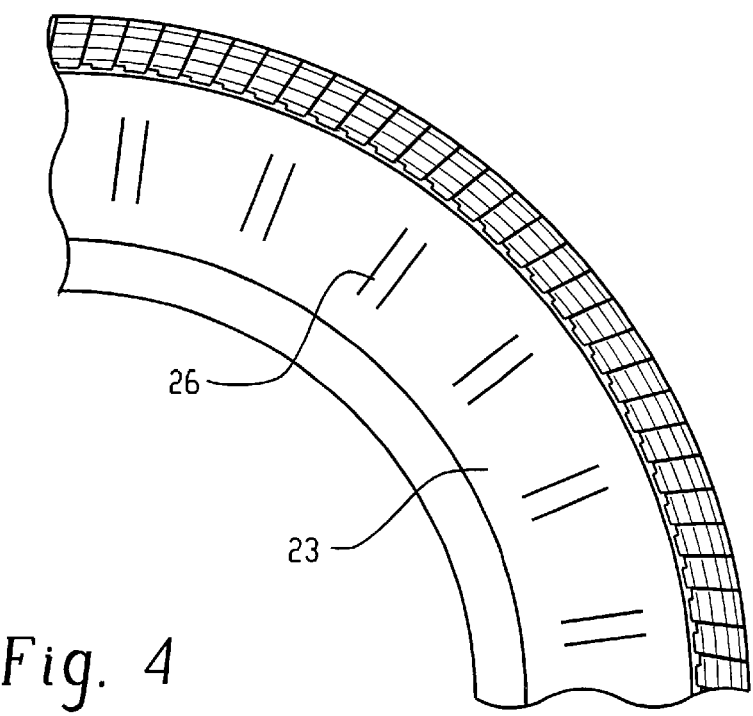
FIG. 4 shows another alternate embodiment for the arrangement of radially extending ribs on a sidewall outer layer.

The ribs 6 separating the sections 4 and 5 of opposite polarization of magnetization do not have to radially extend over the entire sidewall outer layer 3. FIG. 3 shows an alternate embodiment of the invention where ribs 16 only extend over the radially outer half of sidewall outer layer 13. Similarly, FIG. 4 shows another alternate embodiment where ribs 26 only extend over the radially central area of sidewall outer layer 23. Generally, however, the ribs preferably extend over at least part of the radially outer area of the sidewall outer layer. The ribs 16 and 26 in FIGS. 3 and 4 serve the same purpose as the ribs 6 in FIGS. 1 and 2.

Typically, the present invention is applied to a pneumatic tire and the magnetization is carried out from the outside of the inner sidewall of the tire. However, the present invention could be applied to any piece of rubber or other elastomeric material that can be magnetized. For a suitable rubber mixture, European Patent Application 849 597 discloses a mixture that contains particles of neodymium iron boride or of another ferromagnetic substance. Tests have shown that iron oxide, $Fe_2O_3$, and strontium ferrite, SrFe, are also suitable for this purpose. The ferromagnetic substance will be mixed into the soft rubber in powder form. Due to the fact that the applied magnetization is reduced at temperatures above the vulcanization temperature, the magnetization is applied after vulcanization. The sidewall 2, including the sidewall outer layer 3, is extruded from the rubber mixture. The tire 1, including the sidewall 2 and all other components of the tire, will be put into its final form using a tire mold, as is well-known in the art. Only afterwards, the peripherally alternating magnetic fields are applied to the sidewall outer layer 3 which results in the magnetization shown in FIGS. 1 and 2.

A tire constructed according to the principles of the present invention can be used to generate signals which can be detected by sensors and used to identify the tire or to determine information relating to the dynamic behavior of the tire. Some of the information which can be determined using the present invention include the rotational speed of the tire, the angular position of the tire, the lateral or cornering forces on the tire, the radial forces on the tire, and the longitudinal forces on the tire (e.g., sidewall torsion, torques, and fore-aft forces). For example, in order to determine the sidewall torsion, a tone wheel can be attached to a vehicle chassis and used to compare the location of the radially inner and outer portions of the ribs. The results of such a comparison are used to determine the sidewall torsion of the tire. The determination of accurate information relating to the dynamic behavior of the tire depends on the precise measurement of the lines of magnetic flux. By enabling such a precise measurement, the present invention provides for a more accurate determination of the information.

What is claimed is:

1. A tire, comprising:
    a magnetized outer layer;
        the magnetized outer layer being peripherally divided into sections of alternating polarity; and
        the magnetized outer layer including radially extending ribs between each adjacent pair of sections, the ribs protruding above the sections.

2. The tire of claim 1, wherein the magnetized outer layer is a part of a sidewall of the tire.

3. The tire of claim 2, wherein the ribs extend over at least part of the radially outer area of the sidewall outer layer.

4. The tire of claim 1, wherein the ribs are equidistant from one another in the peripheral direction.

5. The tire of claim 1, wherein the ribs are significantly narrower than the sections in the peripheral direction.

* * * * *